May 31, 1960   R. E. SELTZER   2,938,451
HYDRAULICALLY OPERATED BALING MECHANISM
Original Filed April 15, 1952   7 Sheets-Sheet 2

INVENTOR.
ROBERT E. SELTZER
BY Toulmin & Toulmin
ATTORNEYS

May 31, 1960 R. E. SELTZER 2,938,451
HYDRAULICALLY OPERATED BALING MECHANISM
Original Filed April 15, 1952 7 Sheets-Sheet 7

Fig. 10

INVENTOR.
ROBERT E. SELTZER
BY
Attorneys

United States Patent Office 2,938,451
Patented May 31, 1960

2,938,451

HYDRAULICALLY OPERATED BALING MECHANISM

Robert E. Seltzer, Bellevue, Ohio, assignor to The American Baler Company, Bellevue, Ohio, a corporation of Ohio Original application Apr. 15, 1952, Ser. No. 282,429, now Patent No. 2,768,574, dated Oct. 2, 1956. Divided and this application June 22, 1953, Ser. No. 362,998

6 Claims. (Cl. 100—4)

This invention relates to a baling machine, particularly to an automatic baling machine, and more particularly still to a hydraulically operated baling machine and a control system for controlling the operation thereof. This application is a division of my co-pending application Ser. No. 282,429, filed April 15, 1952, issued as U.S. Patent 2,768,574 on October 2, 1956.

The baling machine with which this invention is particularly concerned is a machine especially adapted for the baling of industrial wastes and the like. It will be understood, however, that the machine could also be employed for baling agricultural crops if desired.

In general, a baling machine of the nature referred to operates to compress material and to form bales of a predetermined size and to band and tie the bales when they reach that size. The integration of the operation of the baling machine, the measuring of the bale size, the passing of tieing bands about the bale, and the twisting or tieing together thereof by a single control system is the particular subject matter with which this invention is concerned.

Accordingly, it is a primary object of the present invention to provide an improved hydraulic operating system for the actuation of an automatic baling machine, including the automatic banding of the bale, and tieing or twisting together of the banding elements.

A still further object of this invention is the provision of an electric control system in association with a hydraulic system according to the foregoing subject.

A still further object of this invention is the provision of a completely automatic control system including hydraulic and electrical components for a baling machine of the nature referred to.

Another particular object of this invention is the provision of an electric and hydraulic control system for baling machines which is completely automatic in operation and which provides for rapid operation of the baling machine.

Another particular object of this invention is to provide control means in combination with a baling machine of the nature referred to which will insure that the bales being produced by the machine are of uniform characteristics throughout, particularly as to density.

Another object is the provision of an actuating system for the baling head of the baling machine wherein the baling head works under a substantially constant load regardless of the characteristics of the material being baled.

These, and other objects and advantages, will be more apparent upon reference to the following specification taken in connection with the accompanying drawings, in which.

*General arrangement*

A baling machine according to my invention comprises a generally horizontal frame in which is reciprocably mounted a baling head that is driven by a hydraulic motor. The baling head is reciprocable beneath a hopper extending vertically from the frame and through which the material to be baled is fed. The hopper comprises gates at the bottom which swing inwardly to close off the feed of material to the baling chamber, and which will open when there is a predetermined amount of material in the hopper above the gates, so that a full charge of material may be supplied to the baling chamber.

The baling head is so controlled that it will only operate when there is a full charge of material in the baling chamber, and this prevents needless inspection of the baling chamber.

The compressed material is pushed through a rather elongated chamber in the usual manner, with resistance to movement of the material being accomplished by pressing opposite walls of the chamber toward each other. A measuring wheel bears on the material being pushed through this chamber, and at a predetermined length of bale, is operable to interrupt the baling cycle and to initiate a banding and tieing cycle.

The banding of a bale according to my invention is accomplished by wires which are pushed across in front of the baling head, so that as a bale is built up thereby, the banding wires will extend around three sides of the bale. Thereafter, the wires are pushed across the back end of the bale and a novel cut-off and twister unit is operable to cut off the thrust across wire, to clamp the end of the wire leading to a supply reel, to twist together the two ends of the wires passing about the bale, and to tuck the cut off ends of the wire into a corner of the bale.

At the completion of the banding cycle, the parts of the banding, twisting and cut-off mechanism retract to a rest position, and the machine then commences to build up a new bale.

The actuation of the baling head, the thrusting of the wires across the back of the bales, the maintaining of the compression of the bale so that it will be formed with a predetermined density, and the actuation of the wire twisting and tieing mechanism is accomplished by means of hydraulic power, while an electrical control system is provided for controlling the actuation of the valves and other elements of the hydraulic system.

General construction

The general construction of the machine comprises a frame, generally indicated at 10, which may be supported on a floor by transverse beams 12. At the left end of the frame 10, as it is viewed in Figure 1, there is a hydraulic motor 14 adapted for reciprocating baling head 16 in a compression chamber 18. The baling head 16 has transverse slots 17 therein which align with the needles for pushing wires across the front of the baling head.

Compression chamber 18 is open at the top, and a feed chute or hopper 20 is provided for supplying material to chamber 18 ahead of baling head 16. Doors, or gates, 22 pivotally mounted at opposite sides of the lower end of the hopper control the supply of material to chamber 18. The doors 22 are mounted on a frame which has a height that is equal to the width of each of said doors. The material so supplied to the chamber is pushed therethrough by the baling head 16 into a baling chamber 24, and in which baling chamber the material is compressed and takes the form of a bale.

The hopper or feed chute arrangement, generally indicated by reference numeral 20, has been indicated as having the gates 22 at the bottom thereof. As will be seen in Figure 1, the gates 22 are supported on shafts 50 that are journaled in the end walls of the hopper as shown.

Counterweights 62 are associated with shafts 50 to move with the gates, so that the gates will not open until a predetermined amount of material is resting thereon. Preferably, there are also provided other counterweights 64 which are so arranged that they pass over center as the gates open and actually assist in opening during the last part of their movement. The purpose of counterweights 64 is so that the gates will always open fully and will remain open until all of the material in the hopper or feed chute has been discharged therefrom.

Figure 8:
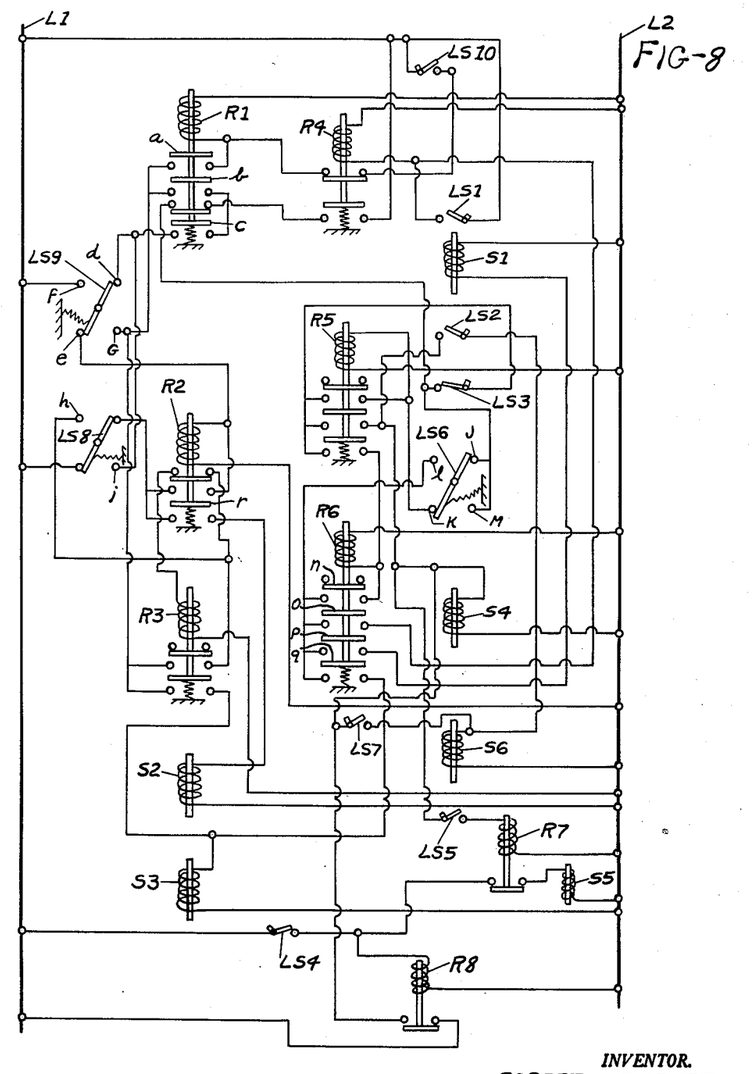
Figure 8 is a diagrammatic representation of the electric control circuit that controls the operation of the hydraulic system according to the position occupied by the moving elements of the machine.

One of the shafts for the gates mounts a cam which cooperates with a limit switch LS1 shown in Figure 8. Limit switch LS1 is normally open and is adapted for being closed when the gates move to their open position and for being held closed while the gates remain open, and this switch serves to control the operation of the baling machine so that the baling head remains idle whenever the gates are closed, and only operates when the gates open.

The exit end of the baling chamber 24 has the conventional discharge end of the usual automatic baling machine, which includes a structure for forming a barrier against which the initial bale made in the machine can be built up.

When a predetermined length of material has been compressed in chamber 24, as can be detected by the bale measuring device 26, the baling cycle is interrupted with the baling head dwelling in its advanced position, and then wires are thrust across the back of the bale.

Figure 3:
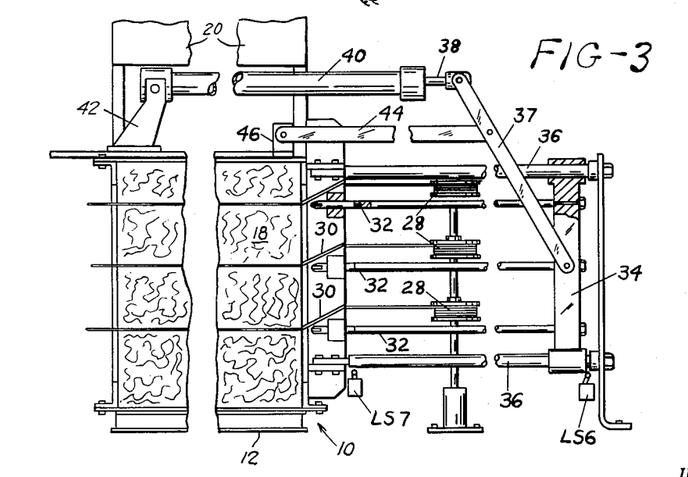
Figure 3 is a transverse section indicated by line 3—3 on Figure 2 showing in elevation the mechanism for thrusting the wires across the back of the bale with a portion of the baling machine being shown in section.

Figure 3 will reveal that there is positioned on one side of the machine, a plurality reels 28 carrying baling wire, and that these wires lead through tubes 30 into position to be picked up by needles 32 and thrust across the back of the baling head. Needles 32 are carried by cross head 34 guided on rods 36. Cross head 34 is adapted for being driven by lever 37 pivoted at one end to the cross head and at its other end to a ram 38 that extends into a cylinder 40 which has its closed end pivotally supported on a bracket 42 carried on the top of the baling machine. Lever 37 has an intermediate point thereof pivoted to one end of a rod 44 which has its other end pivoted to a bracket 46 carried by the baling machine. Rod 44 forms a floating pivot for lever 37 and this feature, together with the pivotal support of the cylinder 40, permits cross head 34 to move in a straight line along rods 36.

Figure 2:
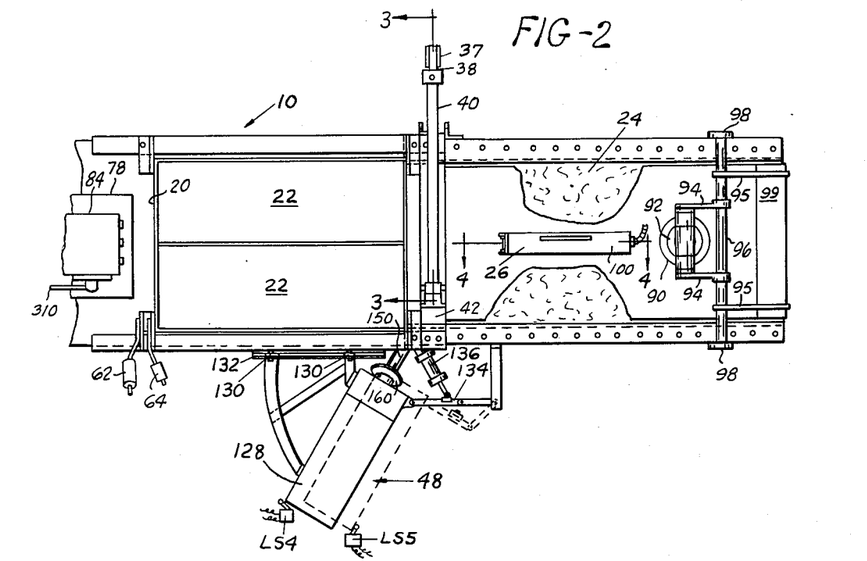
Figure 2 is a top plan view of the central and right end portions of the baling machine with the hopper doors closed and showing in particular the arrangement for cutting off and twisting the wires after they have been passed around the bale with details of the thrusting mechanism being omitted.

After the wires have been thrust across the chamber, a cut off and twister unit, generally indicated at 48, is moved to its position as indicated by dash lines in Fig. 2 and becomes operable to cut off the wire, to grip the end thereof leading to the associated reel 28, to twist the ends of the wire together, and to tuck the ends of the wire into a corner of the bale; after which, all the parts retract to a rest position and the baling of material again commences by reciprocation of the baling head.

This process is described in parent Patent 2,768,574 issued October 30, 1956.

Baling mechanism

Figure 1:
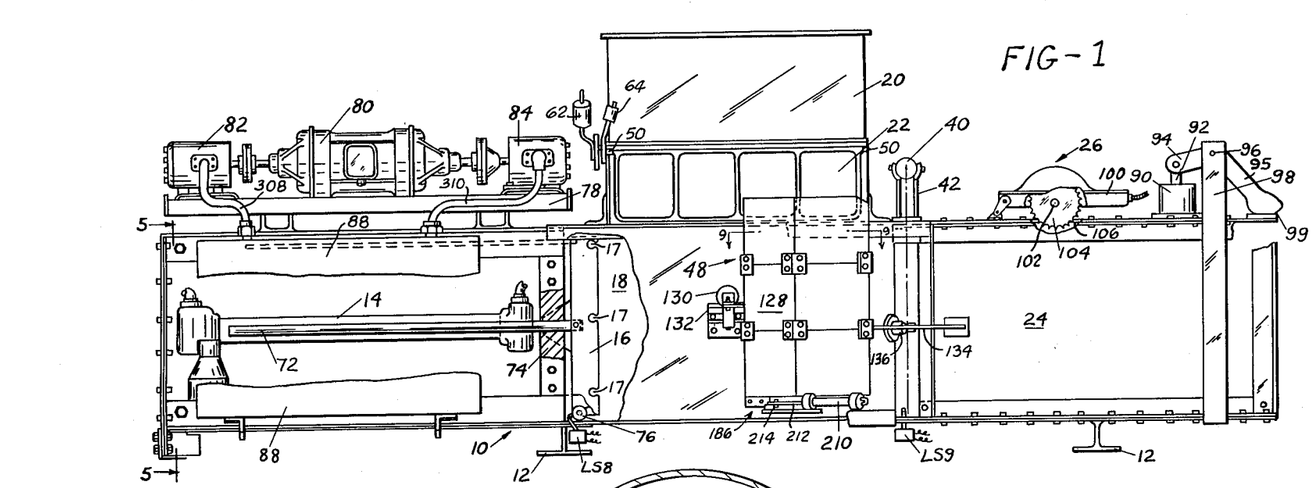
Figure 1 is a side view with a portion of the reservoir broken away to show the hydraulic motor, of a typical baling machine with the hopper doors open having a control system according to my invention associated therewith.
Figure 5:
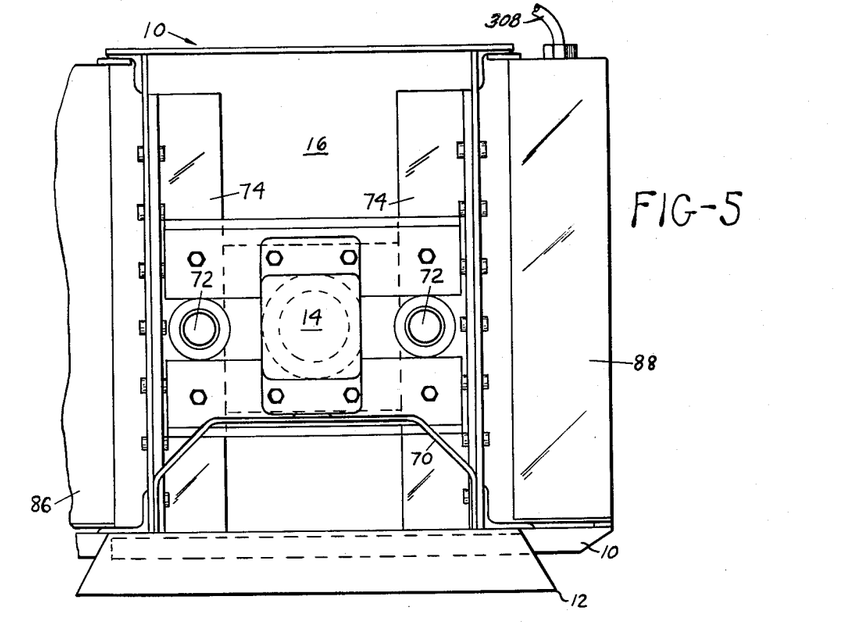
Figure 5 is a partial sectional view indicated by line 5—5 on Figure 1 showing the arrangement for guiding the baling head of the machine.

The baling mechanism which includes the baling head 16 and which is driven by a hydraulic motor 14 is generally arranged as will be seen in Figures 1 and 5.

The motor 14 has its rear end supported on a bracket 70 as shown in Figure 5 while the ram extending therefrom is connected at the opposite end of the motor to the baling head 16. For the purpose of guiding baling head 16 in the machine, and for maintaining it at an upright position at all times, there is attached to the baling head a pair of guide rods 72 that extend rearwardly therefrom on opposite sides of hydraulic motor 14.

These guide rods 72 extend through a stationary cross head 74 which is provided with suitable bearings for receiving the rods. The cross head 74 is firmly bolted in position in the frame of the machine, and by this construction the left end of the machine is made extremely strong and rigid.

Preferably, the baling head 16 includes rollers 76 at the bottom thereof which rest on the bottom wall of the chamber and thus support the baling head at all times thereby to prevent the baling head from bearing with frictional engagement on the walls of the chamber.

The left end of the baling machine as seen in Figure 1 is employed for supporting a platform 78 on which is mounted a hydraulic power unit for powering the baling machine. In this instance the unit comprises an electric drive motor 80 drivingly connected with pumps 82 and 84, one of which is a high pressure-low volume pump, and the other which is a low pressure-high volume pump.

Further, and as will best be seen in Figures 1 and 5, fluid reservoirs or storage tanks 86 and 88 may be mounted on opposite sides of the baling machine at the left end thereof, and by means of suitably arranged conduits, supply fluid to pumps 82 and 84, and receive the exhaust fluid returning from the various hydraulic motors operated by the pressure fluid developed by the said hydraulic pumps.

Density regulating mechanism

It has been mentioned that the bale being compressed in the baling chamber 24 encounters a controlled resistance, whereby the density of the bale being made can be regulated by pressing the top and bottom walls of chamber 24 toward each other, and this is accomplished by the arrangement that is illustrated at the right end of Figures 1 and 2. Mounted on the top wall of chamber 24 is a hydraulic cylinder 90 in which is mounted a plunger 92 adapted for being driven upwardly in cylinder 90 by a supply of pressure fluid thereto. The upper end of plunger 92 is pivotally connected to lever means 94 which pivots on shaft 96 supported in the upright members 98 that extend vertically along opposite sides of chamber 24 and which have their lower ends rigidly secured to the lower wall of chamber 24.

Lever means 95 on the side of shaft 96 opposite lever means 94 bear on the upper wall of chamber 24, as at 99. A supply of pressure fluid to cylinder 90 will bring about a downward thrust on the upper wall of chamber 24 and a upward thrust on the lower wall thereof which will serve to confine between the said walls the bale being made, whereby a predetermined density can be maintained in the said bale.

Conventional hinges, pintles or the like are mounted on the left end of the top and bottom walls of chamber 24 to enable said walls to move toward and away from each other in order to accomplish the desired result referred to above.

Figure 4:
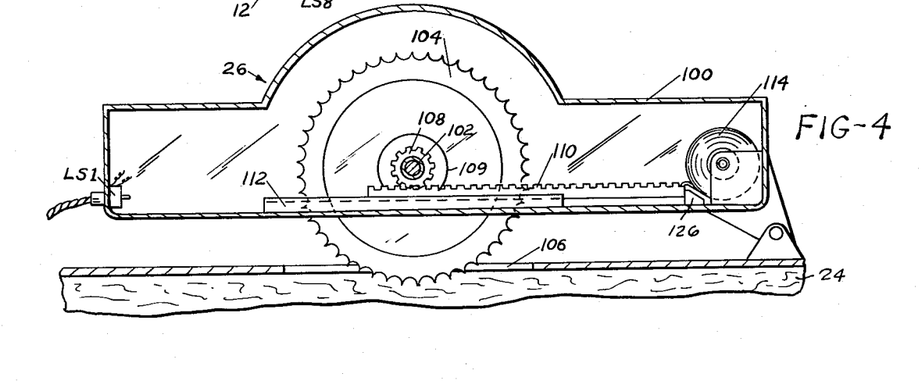
Figure 4 is a vertical sectional view indicated by line 4—4 on Figure 2 showing the bale measuring mechanism associated with the baling machine.

The bale measuring mechanism 26 is illustrated in Figures 1 and 4 and comprises a housing or frame 100 pivotally supported on the top wall of baling chamber 24 and having rotatably mounted therein a shaft 102 which carries a wheel that extends through a slot 106 in the top wall of baling chamber 24 so as to engage the bale being pushed through the baling chamber to be rotated thereby.

Also carried by shaft 102 is a pinion gear 108 that meshes with a rack 110 slidably guided by the guide means 112 in the housing and biased to the right as seen in Figures 1 and 4 by the spring means 114 in the form of a coiled ribbon, also in the housing. As the bale is formed in the baling chamber the plate 104 together with shaft 102 and gear 108 are rotated in a direction to move rack 110 toward limit switch LS1 in the housing and after a predetermined length of bale has passed beneath the bale measuring device, the rack 110 will engage and actuate the limit switch. The gear 108 is rotatably mounted on shaft 102 and clutch means 109 are provided whereby when the clutch is engaged the wheel 104 will drive the gear 108 and when the clutch is disengaged the gear 108 is free to rotate on the shaft.

Solenoid S1 is connected with the clutch means 109 so that energization of the solenoid will bring about disengagement of clutch means 109 from pinion 108, while de-energization of solenoid S1 will permit the clutch means to move into engagement with the pinion.

At the left-hand end of housing 100 preferably adjustably mounted therein, is a limit switch LS1 adapted for being closed by rack 110. The described arrangement operates generally in the following manner:

Clutch 109 is normally engaged with pinion 108 so that as a bale is built up in the chamber, wheel 104 is rotated thereby, pinion 108 is also rotated, and this drives rack 110 leftwardly. When rack 110 engages limit switch LS1, it indicates that a banding cycle should be initiated, and therefore the said limit switch is connected in circuit in a manner which will be described hereinafter, to interrupt the baling cycle and to initiate a banding and tying cycle.

At some time during the thus initiated banding and tying cycle, solenoid S1 will be energized to detach pinion 108 from wheel 104, and this will permit spring means 114 to return rack 110 against abutment 126, so that when baling is re-commenced, the bale measuring device is ready for a new measuring cycle.

Wire twisting and cut-off unit

The wire twisting unit is generally designated by the reference numeral 48, and this unit in the machine illustrated in the present application comprises three separate cut-off and twister sections mounted in a single frame and driven by a single electric motor.

Figure 9:
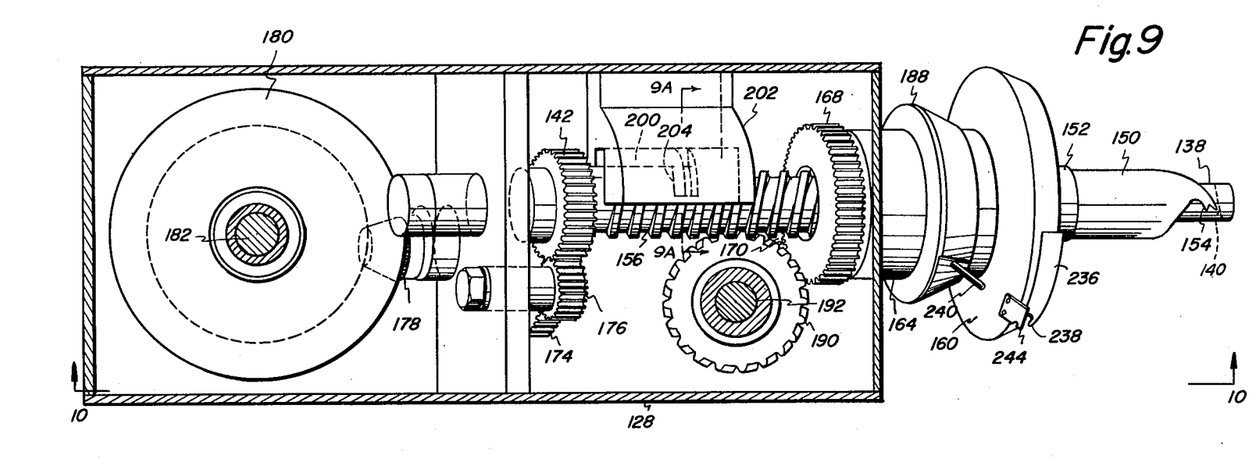
Figure 9 is a sectional view along the lines 9—9 of Figure 1 showing the details of the wire twisting mechanism.
Figure 10:
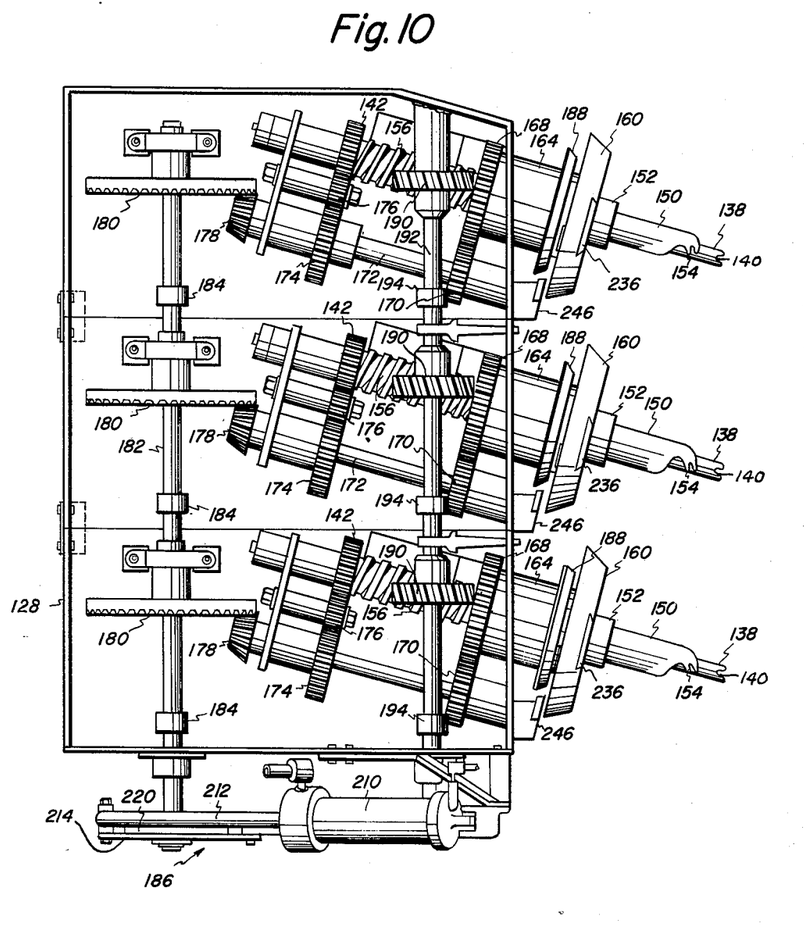
Figure 10 is a sectional view along the lines 10—10 of Fig. 9 illustrating the internal construction of the wire twisting mechanism.

Each unit consists of a slotted rod which will be referred to as the twister rod, a sleeve reciprocable and rotatable on the rod and having a notched end part which is the tucker sleeve, and a rotatable cut-off and transfer plate which consists of means for severing the baling wire and for gripping the end thereof. The unit referred to is best illustrated in Figures 9 and 10.

In these figures, it will be observed that the twisting unit comprises a frame 128 which, as is most clearly illustrated in Figures 1, 2, 9, and 10, comprises three superimposed sections associated with each of which is a complete twister and cut-off unit. The arrangement of the twister unit in sections permits the use of as many thereof as may be necessary. In the machine illustrated in the drawings, three twister units are employed, but in other instances, more or fewer might be required and the sectionalized construction illustrated is important for this reason.

With reference to the present invention, which deals with the hydraulic and control system associated with the machine, it may be noted that the twister unit comprises a frame 128 provided with rollers 130, as will be seen in Figures 1 and 2, which engage track means 132 on the side of the baling machine. This permits movement of the twister and cut-off unit longitudinally of the machine between its full line and dotted line positions in Figure 2.

For so moving the unit there is connected to the jointed arm 134, which has one of its ends connected to a stationary point on the frame of the baling machine, a hydraulic motor 136 which is provided for breaking the arm to move the unit to its dotted line position and for then straightening the arm to move the unit back to its full line position.

Referring to the twisting mechanism proper associated with each section of the twisting units, reference may be had to Figures 9 and 10, wherein it will be seen that each of the said sections comprises the central rod 138 having its end adjacent the baling machine slotted as at 140 and at its other end carrying a pinion 142. Bearing means rotatably support rod 138.

Surrounding rod 138 is a sleeve 150 reciprocable and rotatable in bearings 152 and having a projecting hook-like end part 154. Sleeve 150 has a helical gear portion 156 integral therewith, and adjacent this portion is a bearing between the sleeve and rod 138.

Rotatably mounted above sleeve 150 is a larger sleeve part which is journaled in bearings within a still larger sleeve member 164 that is rigidly mounted in the adjacent wall of frame 128. At its outer end the larger sleeve part carries the rotary cut-off and transfer plate 160 which is for the purpose of gripping the end of the baling wire and also for clipping the banding wire off during a tying operation. At its other end, the larger sleeve part carries a gear 168 which meshes with a gear 170 pinned to a shaft 172 that is journaled in frame 128. Shaft 172 also mounts a gear 174 that drives through an idler 176 into pinion 142 that is pinned to rod 138.

Shaft 172 carries at its extreme inner end a bevel gear 178 that meshes with a main driving face gear 180.

As will be seen in Figure 10, the face driving gears 180 of the three sections of the twister unit are mounted on a common vertical shaft 182 having couplings 184 for connecting the various sections of the unit together, and at its bottom end shaft 182 is adapted for being driven by a driving unit, generally indicated by numeral 186.

Returning to Figure 10, the outer end of stationary sleeve 164 for each section of the twister unit comprises a cam 188 fixed thereon, the purpose of which is to actuate the wire gripping elements carried by the rotary cut-off and transfer plate adjacent thereto. As previously described, the cut-off and transfer plate 160 is also mounted on the stationary sleeve 164 so that there is no relative movement between the cam 188 and the cut-off plate 160. The cam 188 has cam surfaces thereon so arranged that the pins 240 actuated by the cam 188 are in wire gripping position somewhat less than 180° of revolution of the cut-off and transfer plate 160 and are in wire releasing position the remainder of the rotation of the plates 160 as described in the parent Patent 2,768,-574, issued October 30, 1956.

The helical gear portions 156 of the several tucker sleeves 150 are each engaged by a corresponding helical gear 190 fixed on a vertically extending drive shaft 192 provided with couplings 194 in the manner and for the reason already described in connection with shaft 182 and couplings 184 therefor. The extreme lower end of shaft 192 extends into the drive 186 at the bottom of the unit.

Figure 9A:
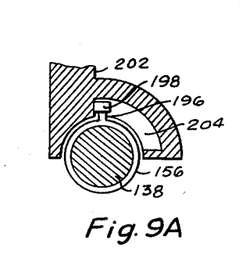
Figure 9A is a sectional view taken along the lines 9A—9A of Figure 9.

The previously mentioned helical gear 156 is availed of for giving the associated tucker sleeve first a reciprocatory and then a rotary movement by fixing on the said helical gear 156 a pin 196 having a head 198 that extends into a slot 200 cut longitudinally in a block 202 carried by frame 128 so that the slot 200 extends axially of the helical gear 156. At the extreme right end of slot 200, as viewed in Figure 9, there is a circumferentially extending slot 204, as illustrated in Figures 9, 9A and 10, which is at an angle to the slot 200 corresponding to the pitch of the helical gear 156. It will be apparent that rotation of the helical gear 190 will first cause axial movement of the associated sleeves 150, because of the longitudinal movement of the pins 196 in the slot 200, until the heads 198 of the pins 196 bottom at the right ends of slots 200, and thereafter, further rotation of the helical gears 190 will cause rotation of the said sleeves because of the heads 198 of the pins 196 moving along the circumferential slots 204.

Figure 6:
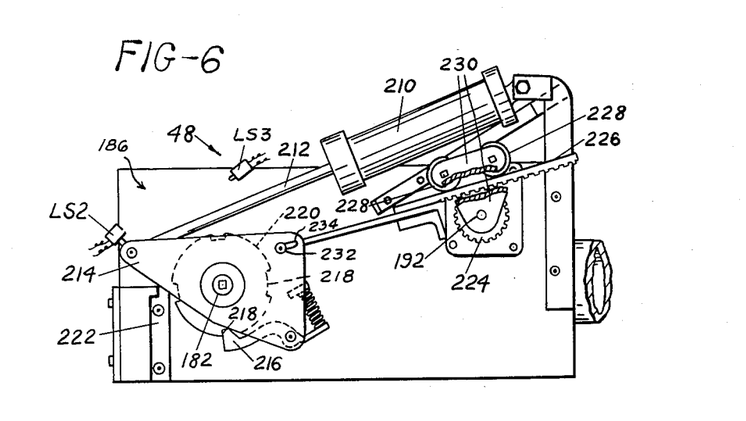
Figure 6 is a bottom plan view of the wire twisting and cut-off unit as shown in Figure 10 and as mounted on the baling machine of Figure 1 and showing the actuating motor therefor.

The driving arrangement for the twisting and cut-off unit is illustrated in Figure 6 where it will be seen to comprise a hydraulic cylinder 210 having a plunger 212 extending therefrom which is connected with a plate 214 journalled on the lower end of a shaft 182 that extends upwardly into the twister unit so as to be pivotable on said shaft, and which shaft, upon rotation, serves to actuate the operating elements of the twister and cut-off unit. Thus the plate 214 pivots under the action of the plunger 212 and the hydraulic cylinder 210.

Plate 214 has pivoted thereto a pawl 216 adapted for engaging the notches 218 in the periphery of a ratchet plate 220 fixed on shaft 182. Pawl 216 is shaped to drive the ratchet plate positively in a clockwise direction as it is viewed in Figure 6, and to be impositive for driving the cam plate when moving counterclockwise.

As will be seen hereinafter, it is desirable after the twister rods have been driven in rotation to twist the wires together, to back the said rods up at least a slight amount to release the twisted wires therefrom, and for this reason there is provided a stationary cam or stop 222 adapted for engaging the arcuate back surface of pawl 216 at a predetermined point during its forward or clockwise motion, so that thereafter, when the drive is reversed, a predetermined amount of counterclockwise motion of the pawl and cam plate 220 will occur before pawl 216 moves out from beneath cam or stop 222 and releases the cam plate.

It is desirable for a portion of the twisting and cut-off unit to be operated at a later time than that portion thereof that is connected to shaft 182 and for accomplishing this delayed actuation, there is a shaft 192 having a gear 224 fixed to its lower end which meshes with a rack 226. The rack 226 is held in engagement with gear 224 by rollers 228 carried on a plate 230, a portion of said plate being removed in Figure 6, and pivotally connected with the lower end of shaft 192. The rack is connected by means of a pin 232 and slot 234 with plate 214. Slot 234 is so located, and extends in such a direction, that plate 214 will move through a substantial angle in its clockwise direction before the rack will be picked up and moved to actuate that portion of the twister and cut-off unit for which the delayed actuation is desired. In its rest, or idle, position, plate 214 is positioned so that it closes and actuates a limit switch LS2, whereas in its fully advanced position, the left end of the upper edge of the plate 214 as seen in Figure 6, engages a limit switch LS3 to actuate the switch.

As will be seen, the sleeve 150 is geared directly together with its associated twister rod and rotation of sleeve 150 and its connected cut-off and transfer plate will thus commence as soon as rotation of the associated twister rod commences.

Referring more in detail now to the mechanism for cutting off and gripping the wire, this mechanism is illustrated in Figures 9 and 10. Each of the rotary cut-off and transfer plates 160 comprises a pair of diametrically opposite blocks 236 having their leading ends arranged with an extending part 238 that forms a notch or pocket for receiving the banding wire when the cut-off plate and transfer member is rotated.

The transfer plate and cut-off member is angularly bored in the region of the notches formed by extending parts 238, and reciprocably mounted in the bores are the pins 240 having one of their ends bearing on the surface of the cam 188 and their ends positioned adjacent a depression in the rear face of the block 236, as will be best seen in Figure 9.

Mounted on the cut-off plate in substantial alignment with each of the described notches are the shearing blades 244 that are so positioned that when member 160 is rotated the said blades will rotate closely by the stationary shearing blades 246 carried by the frame 128 of the twister unit. In this manner, the wire picked up in the notch formed by the block 236 will be sheared off.

The cam 188 is so arranged that the pins actuated thereby are in wire gripping position somewhat less than 180° of revolution of the cut-off and transfer plate 160 and are in wire releasing position during the remainder of the rotation of the plates. Each of the pins 240 has associated therewith a spring that continuously urges it toward wire releasing position as described in the parent Patent 2,768,574, issued on October 30, 1956.

Each of the twister rods preferably has its notched end formed as is illustrated in Figure 10. The notch 140 in the end of the twister rod is formed by drilling the rod axially, and then milling along the length of the rod on opposite sides of the drilled hole with parallel slots that are also on opposite sides of the transverse center line of the rod. At the bottoms of these last-mentioned milled slots, a V-shaped configuration is formed by drilling inwardly toward the axis of the rod along line inclined about 45° toward the outer end thereof. The arrangement is such that when a pair of crossed wires are received in the notched end of the twister rod and then twisted, the enlarged central part of the slot 140 receives the twisted together part of the wires, while undercut parts of the slot 140 tend to receive and retain the projecting ends of the wires. The wires thus have little tendency to slip out of the notch in the end of the twister rod once the twisting has commenced.

It has previously been mentioned that the banding mechanism comprises the three rods or needles 32 carrying at their ends rollers for engagement with the banding wires. The rods or needles 32 are constructed and cooperate with the twister rod and rotary cut-off and transfer plate by providing the needle 32 with a notch for receiving the end of the twister rod after the needle has been thrust across the back of a bale and the twister unit then moved lengthwise of the machine to bring the twister rods into operative position.

Similarly, the end of needle 32 (see Figure 3) adjacent the periphery of the rotary transfer and cut-off plate 160 is provided with a notch into which at least the block 236 and adjacent shearing blade 244 on the cut-off and transfer plate can extend thereby to pick up the wire from the needle 32 when the cut-off and transfer plate is rotated.

It might also be noted that the twister and cut-off frame 128 is arranged to actuate a limit switch LS4 when the frame is in a fully retracted position of the unit, and to engage and actuate a limit switch LS5 when the frame is in the fully advanced or working position of the unit.

Similarly, and with reference to Figure 3, the cross head 34 for the needles 32 is adapted for engaging and actuating a limit switch LS6 when the cross head is in its fully retracted position and for engaging and actuating a limit switch LS7 when the cross head is in its fully advanced position.

Also, the baling head 16 is adapted for engaging and actuating a limit switch LS8 when the baling head is in its fully retracted position and for engaging and actuating a limit switch LS9 when the baling head is in its fully advanced position.

Banding operation

Assuming a bale has been built up in the machine to the desired size, it is then desired to thrust the wires across the back of the built-up bale. As soon as the bale has reached the required size, the baling head will come to rest in its fully advanced position and motor 40 will then be actuated to drive needles 32 across the back end of the bale and at the face of the baling head.

Thereafter, the motor 136 is actuated to move the twisting unit 48 lengthwise of the machine to bring the notched ends of the twister rods into engagement with the wire passing around the bale at the point where the wire crosses itself.

Thereafter the drive for the twister unit will be actuated, which will bring about rotation of the twister rods to twist the ends of the wire together, and at the same time, will drive the rotary cut-off and transfer plates to pick up the wires from the needles to grip the wires and also to shear off the wires.

After the wire has been cut off and twisted the tucker sleeve advances and tucks the raw ends of the wire into the corner of the bale. Thereafter, the twister unit moves back into its original position, the needles retract backwardly across the chamber, and a new baling cycle can be commenced.

Hydraulic control circuit

Figure 7:
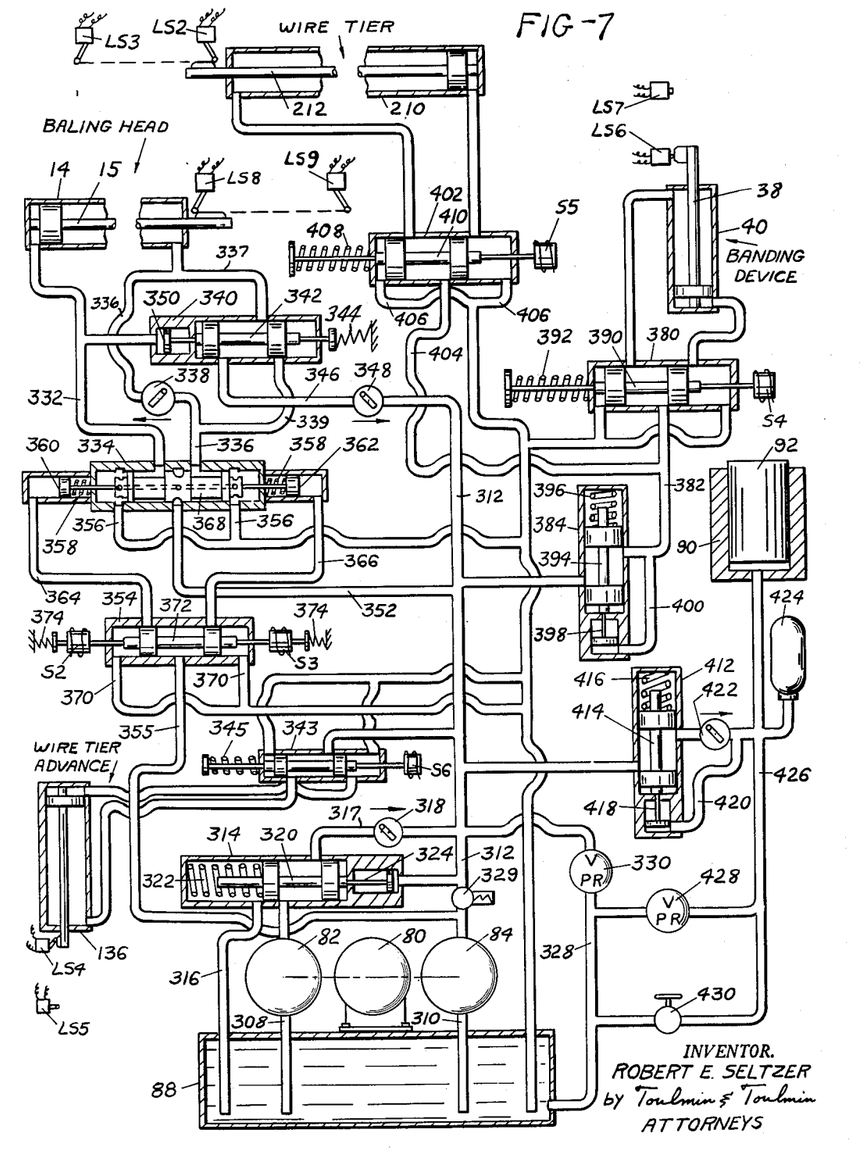
Figure 7 is a diagrammatic view of the hydraulic control system for the machine.

The hydraulic control circuit for controlling the operation of the baler and the banding and tieing mechanism is illustrated schematically in Figure 7. In this view the two pumps 82 and 84 which are driven by motor 80, have suction conduits 308 and 310 respectively, extending into a tank or reservoir 88. Pump 82 is a low pressure-high volume pump, whereas pump 84 is a high pressure-low volume pump. Pump 84 delivers into a conduit 312, and pump 82 delivers into one port of a by-pass valve 314. A conduit 317 including a check valve 318 connects another port of the valve 314 with conduit 312. Mounted within the valve 314 is a valve member 320 normally biased rightwardly by spring 322 into position to interconnect the discharge side of the pump 82 with conduit 317.

A pilot cylinder and plunger 324 for the valve are connected with conduit 312, so that at a predetermined pressure in conduit 312 valve member 320 will shift leftwardly so as to connect the discharge side of pump 82 with by-pass conduit 316 leading back to reservoir or tank 88. By this arrangement, pump 82 is unloaded at a predetermined pressure in conduit 312, and thereafter runs light until the pressure in the system drops to such a point that pump 82 can be of use in providing hydraulic power thereto.

Conduit 312 has connected therewith by-pass line 328 having a relief valve 330 for the purpose of relieving conduit 312 of excessive pressure, should it become necessary.

Conduit 312 also has a pressure responsive regulator 329 having a diaphragm or its equivalent that maintains a minimum pressure at the outlet side of pump 84 at all times.

The motor 14 pertaining to the baling head 16 is connected into the hydraulic circuit through a series of valves which provide for a plurality of speeds of operation of the plunger 15 of the motor. The end of cylinder 14 on the advancing side of plunger 15 is connected by a conduit 332 with one of the service ports of a four-way valve 334.

The other service port of this valve is connected by conduit 336 leading through a check valve 338 opening toward cylinder 14 on to the retracting side of plunger 15.

Arranged in parallel relation to check valve 338, is a valve 340 which forms a by-pass with conduits 337 and 339 around the check valve 338. The valve 340 has a reciprocable valve member 342 normally urged by a spring 344 into position to interrupt the by-pass around check valve 338, and instead, to establish a connection between conduit 336 on the outlet side of check valve 338 and conduit 346 leading through a check valve 348 to conduit 312. Valve member 342 is adapted to be shifted into position to establish the by-pass around check valve 338 by a pilot cylinder and plunger arrangement 350 connected to receive actuating fluid from conduit 332.

Valve 334 has a pressure inlet supplied by conduit 352 which connects with conduit 312 from which it receives pressure fluid.

Valve 334 also has exhaust connections at 356 which lead back to tank 88 and has a valve member 368, normally centered by means of centering springs 358 and adapted for being shifted into its two end positions by the pilot plungers 360 and 362 connected by conduits 364 and 366, respectively, with the service ports of valve 354. The valve 334 acts as a hydraulic motor and functions to control the movement of the baling head plunger 15.

Valve 334 is of the center by-pass type, which is an arrangement wherein the valve member 368 of the valve, when in its normally centered position, provides free passage for fluid from the pressure conduit 352 to the exhaust connections 356 and blocks the conduits 332 and 336, thereby preventing motion of the plunger 15.

Valve 354 has exhaust conduit means at 370, and likewise comprises a valve member 372 normally centered by centering springs 374 and adapted to be shifted into its opposite end positions by energization of one or the other of solenoids S2 or S3, associated therewith. Valve 354 is of the closed center type, and when valve member 372 is in its normally centered position, the pressure inlet and the service conduits are closed off. Valve 354 receives pressure fluid directly from pump 84 via a conduit 355 which connects with the pump side of valve 329. Valve 354 serves to actuate the hydraulic motor 334.

Cylinder 40 of the banding device has its opposite ends connected to the service ports of a valve 380 having a valve member 390. A conduit 382 supplies pressure fluid to the valve and the valve member is normally urged into position to retract plunger 38 by a spring 392, whereas energization of a solenoid S4 is adapted for shifting the valve member into its other position, to bring about advancing movement of plunger 38.

Pressure regulating valve 384 is arranged to supply fluid to valve 380 and has a valve member 394 which is normally urged by a spring 396 into a position to afford free communication between the inlet and outlet of the reducing valve.

However, a pilot cylinder and plunger 398 are provided which are connected by the pilot conduit 400 with the discharge side of the pressure regulating valve so that at a predetermined discharge pressure the valve member is moved upwardly to restrict communication between the said inlet and outlet, thereby to regulate the pressure at the discharge side of the reducing valve. In this manner a substantially constant pressure supply of fluid is provided for the operation of plunger 38 in cylinder 40 of Figure 3.

Furthermore, operation of plunger 38 does not operate to reduce to any substantial degree, the pressure acting on the plunger 15, which operates to the baling head.

The plunger 212 and cylinder 210 are arranged with the opposite ends of the said cylinder being connected to the service ports of a four-way valve 402, having an inlet port connected through conduit 404 to the outlet side of pressure regulating valve 384. Valve 402, also includes exhaust connections 406 leading back to reservoir 88. A spring 408 normally holds valve member 410 of valve 402 in position to supply pressure fluid from conduit 404 to the retracting side of plunger 212. However, energization of a solenoid S5 is effective for shifting the valve member to bring about a supply of pressure fluid to the advancing side of the said plunger thereby to cause an advancing movement thereof.

Cylinder 90 and plunger 92, previously described as being associated with the discharge end of the baling machine, are so arranged that a supply of pressure fluid is delivered to cylinder 90 from the outlet of a pressure regulating valve 412 which has its inlet connected with pressure conduit 312. Pressure regulating valve 412 is arranged similarly to pressure regulating valve 384, and comprises a valve member 414 normally urged by spring 416 into position to establish unrestricted communication between the inlet and outlet of the said valve.

However, a pilot cylinder and plunger 418 are provided and are connected by pilot line 420 with the discharge side of the said valve, so that at a predetermined pressure at the outlet of the valve, the said valve member will be moved to restrict communication between the inlet and outlet, thereby to control the discharge pressure from the valve.

A check valve 422 is provided in the discharge line leading from the pressure regulating valve and opening toward cylinder 90. Also on the discharge side of check valve 422 there may be an accumulator 424 having an air vent. The outlet side of the check valve, cylinder 90, and the outlet side of the accumulator 424, are all connected to conduit 426 leading through a pressure relief valve 428, to the reservoir 88. Relief valve 428 may be by-passed by a manually controlled valve 430 which may be opened to drain the cylinder and accumulator, if desired.

The described arrangement in connection with cylinder 90 is such that a predetermined minimum pressure will be built up in conduit 420 in order to urge plunger 92 outwardly with a predetermined thrust. A drop in pressure in supply conduit 312 does not affect this thrust because accumulator 424 will accumulate sufficient fluid to maintain the said pressure, and check valve 422 will prevent reverse movement of fluid from cylinder 90 through reducing valve 412.

At the same time, should plunger 92 be thrust into cylinder 90 by the action of the bale with a thrust exceeding that desired, then pressure relief valve 428 will operate to relieve the system of excessive fluid. At any time, of course, manually operated valve 430 may be opened in order to drain the system associated with plunger 92 of fluid, in order to permit adjustments to be made or for any other reason desired.

The pressure referred to necessary to operate valve member 342 is higher than the pressure necessary to operate the by-pass valve for the low pressure pump, and the arrangement thus provides for three speeds of operation of the baling head and a highly efficient use of the available hydraulic power.

In the operation of the hydraulic system, the three speeds of the advancing baling head are obtained as follows:

(1) *First speed.*—Baling head advances rapidly. Pumps 82 and 84 are both in operation.

The high volume of hydraulic fluid pumped at a low pressure causes a rapid traverse of movement of the piston in the baling head 14.

The fluid is delivered under pressure through the conduit 312, the conduit 352, the valve 334 wherein the valve member 368 has been moved to the right, and conduit 332 to the advancing head of the cylinder 14.

The pressure of the hydraulic fluid at the retracting end of the cylinder 14 is built up in the line 337, valve 340 and line 346, against the check valve 348 by the action of the piston on the fluid.

The check valve 348 is held closed because of the pressure exerted thereon by the pumps 82 and 84 discharging into conduit 312.

(2) *Second speed.*—Baling head advances slower. The pressure in the system increases because:

(1) The baling head engages the mass of material to be baled.
(2) The increase in pressure of the fluid under the action of the retracting side of the piston.

The increase of pressure in the conduit 312 moves the piston 334 of the valve 314 to the left.

This will cause the low-pressure high-volume pump 82 to discharge through the line 316 into the tank 302.

The high-pressure low-volume fluid is delivered from the pump 82 through the conduits and valves previously described to the valve end of the cylinder 14.

The decrease in volume because of the unloading of the low-pressure high-volume pump 82 causes a slower speed of the baling head.

The pressure of the hydraulic fluid is continued to be increased against check valve 348 by the movement of the piston toward the retracting end of the baling head hydraulic motor 14.

(3) *Third speed.*—Baling head advances at slowest speed. The pressure of the hydraulic fluid in the conduit 312 continues to increase because the baling head is now compressing the load and the fluid is being pressed by the retracting side of the piston in the baling head hydraulic motor.

The increase of pressure in the line 332 will now move the piston 350 to the right and thus will move the valve member 342 also to the right as seen in Figure 7.

Thus, the fluid forced from the retracting end of the hydraulic motor 14 by the advancing piston is passed through the conduit 337, valve 340, line 339, conduit 336, through the center of the valve member 368 and out the left end of valve 368 into the exhaust connections 356 which return the fluid back to the tank 88.

Thus, as the pressure increases in the system, the low pressure pump 82 is first unloaded. Upon a subsequent increase in the pressure, the valve member 342 of the valve 340 is moved to the right. In effect, the pressure in the line 346 will very varely be greater than the pressure in the conduit 312 and over the check valve 348. Thus, the pressure of the fluid is increased in the line 346, valve 340, and line 337 against the check valve 348.

Valve 136 has fluid supplied thereto from conduit 312 via reversing valve 343 which is urged by spring 345 toward a position adapted to retract the motor, and which may be shifted in the opposite direction by energization of a solenoid S6.

*Electric control circuit*

Turning now to Figure 8, there is illustrated diagrammatically, the electric control circuit by means of which the entire operation of the baling and tieing mechanism is integrated. In this figure, the power lines are indicated at L1 and L2, and connected therebetween by a plurality of relays identified as R1, R2, R3, R4, R5, R6, R7, and R8. These relays control a plurality of operating solenoids, indicated at S1, S2, S3, S4, S5, and S6.

Also included in the circuit is limit switch LS10 which is controlled by the hopper gates; limit switch LS1, which is operated by the measuring wheel; limit switch LS5, which is operated by the twister unit in its working position; limit switch LS7, which is operated by the wire feed ram in its fully advanced position; limit switch LS3, which is operated by the tier ram in its fully advanced position; limit switch LS6, which is operated by the wire feed ram in its fully retracted position; limit switch LS9, which is actuated by the baling head when the baling head is in its advanced position; limit switch LS8, which is actuated by the baling head in its fully retracted position; limit switch LS4, which is operated by the twister unit in its retracted position; and limit switch LS2 which is operated by the tier ram in its fully retracted position.

Connected in the same circuit with the solenoid of relay R1 is limit switch LS10 through a normally closed blade of relay R4. When the switch is closed, indicating that the hopper gates are open and that, thus, there is an adequate supply of material in the chamber ahead of the baling head, relay R1 is energized. When relay R1 is energized, energy is conveyed through its blades $a$, $b$, and $c$ to contact $d$ of limit switch LS9, and through the blade of limit switch LS9 to contact $e$ thereof, and then to the solenoid of relay R2, thereby energizing relay R2.

Energization of relay R2 will close its blades and the lowest switch blade will complete a circuit to energize solenoid S2, which pertains to valve 354 that controls the main valve that determines the operation of the baling head. LS8 at this time is in the position as shown in Fig. 8.

As soon as the baling head commences to retract, limit switch LS9 shifts to close on its contacts $f$ and $g$, and, at this time, relay R2 is held energized through its upper blade and the blade of limit switch LS8. When the ram is fully retracted, it closes limit switch LS8 on its contacts $h$ and $i$, and this interrupts the energizing circuit to relay R2 allowing it to drop open and to de-energize solenoid S2.

This movement of limit switch LS8, when relay R2 is de-energized, will also bring about energization of relay R3, and through which solenoid S3 is energized, thereby shifting control valve 354 into its opposite end position and bringing about the reversal of the baling head.

When the baling head again reaches its advanced position, limit switch LS9 will return to the position indicated in the drawings, and at which time, if switch LS10 is open, the main control valve 334 for the baling head motor will center and unload the hydraulic system with the exception of conduit 355. If switch LS10, on the other hand, is closed, then, of course, a new cycle of operation of the baling head will obtain.

When sufficient material has been pushed past the measuring wheel 106, the said wheel will move rack 110 to the point where it will close limit switch LS1, and thereby energize relay R4. Energization of relay R4 will interrupt the energizing circuit to relay R1 and establish a circuit for the energization of relays R5 and R6. The establishment of a circuit to relays R5 and R6 will, of course, be made only when the baling head is in its fully advanced position, whereby to interrupt the holding circuit to relay R1.

When the circuit to relay R5 is established, it will be energized by current supplied thereto through the contacts $j$ and $k$ of limit switch LS6. When relay R5 closes, solenoid S4 is energized thereby, which causes operation of the wire feed mechanism. As soon as the wire feed ram commences to move, the limit switch LS6 will move to close on its contacts $l$ and $m$, but, at this time, relay R5 will be held through its own holding circuit leading through limit switch LS3.

When the wire feed ram reaches its furthermost advanced position, thereby positioning the wire completely across the face of the baling head, limit switch LS7 will be closed, thereby supplying energizing current to solenoid S6, which will cause movement of the twister unit into operative position. When the twister unit reaches its working position, it closes limit switch LS5, and this energizes a relay R7 which in turn energizes S5.

When the twister unit leaves its retracted position it permits LS4 which is normally biased to a closed position to close, thus energizing relay R8. R8 establishes an energizing circuit for S4, and for S6 when LS7 is closed.

At the extreme end of the stroke of the ram 212 of the tier motor, and, therefore, at the conclusion of the tieing operation, limit switch LS3 will be opened, and thereby de-energize relay R5, and which, in turn, will cause de-energization of R7. De-energization of R7 will de-energize S5 to cause the tier motor to retract. At this time S4 and S6 remain energized on account of the energizing circuit established by R8. When the tier motor is fully retracted, it opens limit switch LS2 which de-energizes solenoid S6 and permits retraction of the twister unit. When the twister unit is fully retracted it opens LS4 to de-energize R8 which will interrupt the circuit to S4.

When the wire feeding motor is fully retracted, limit switch LS6 will return to the position where it closes on contacts $j$ and $k$. At this time, of course, relay R6 is de-energized, and this completes the wire tieing cycle.

In connection with relay R6, it may be noted that it is energized upon energization of relay R5. When relay R6 is energized, the switch $p$ is closed which energizes solenoid S1 which resets rack 110 associated with the measuring wheel so that the entire system will be reset when relay R6 becomes de-energized. In order to prevent relay R4 from dropping out when limit switch LS1 is opened by the resetting of rack 110, relay R6 also provides a holding circuit for relay R4 through the closed switch $o$. Closing of the switch $r$ of relay R6 holds the coil of the relay R6 energized through contacts $l$ and $m$ of limit switch LS6 until the wire feeding motor is fully retracted to close contacts $j$ and $k$.

When there is insufficient material in the hopper to supply the baling chamber, the baling head rests in its furthermost advanced position with the entire hydraulic circuit under minimum load. Whenever the baling head is stopped in its advanced position by the operation of limit switch LS1 by the measuring wheel, the same conditions obtain.

Since the hydraulic circuit is under minimum load, no hydraulic power would normally be available for operating the wire feeding and wire tieing mechanism. Also, the compression of the material in the baling chamber might force the baling head rearwardly, and, therefore, prevent the transverse slots 17 therein from aligning with the bars or needles 32 which push the wires across in front of the baling head preparatory to a tieing cycle.

Accordingly, when relay R6 is energized, it also energizes solenoid S3 through switch blade $q$, which shifts the valves associated with the baling head motor to the advancing position thereof, and this holds the baling head in its advanced position under pressure and also interrupts the by-pass through the control valve 334 so that pressure can be built up through the system for operating the tieing, wire feeding, and twister advancing motors. This arrangement thus serves the dual purpose for correcting any misalignment between the slots in the plunger and the path of the wire pushing rods, and also conditions the hydraulic circuit so pressure is built up therein.

From the foregoing, it will be evident that the present invention provides for a fully automatic baling machine characterized in that the baling head does not reciprocate unless there is sufficient material in the hopper to insure a full charge of material to the baling head, and that, whenever the bale reaches a predetermined size, it is automatically banded by a plurality of wires, and the wire automatically twisted and cut off and the raw edges thereof tucked into the corner of the bale.

Furthermore, due to the provision of the novel control means associated with the discharge end of the baling chamber, bales of uniform density are always produced substantially independently of the type of material being fed into the baling chamber.

A baler according to my invention, therefore, has wide application not only in industry as a stationary unit, but can be used in connection with baling farm produce and the like either as a mobile or a stationary unit.

Furthermore, the tieing and twisting unit of the present invention is adapted for being associated with substantially conventional baling devices by mounting the tieing and twisting units thereon.

The operation of the tier arrangement is integrated with the hydraulic and electric control systems so that, normally, once the baling machine is set into operation, it will continue to produce uniform and tightly banded bales so long as there is a supply of material thereto.

It will be understood that this invention is susceptible to modification in order to adapt it to different usages and conditions, and, accordingly, it is desired to comprehend such modfications within this invention as may fall within the scope of the appended claims.

I claim:

1. In a baling machine having a reciprocable baling plunger, the combination of a hydraulic motor having advancing and retracting means for driving the plunger, a source of fluid pressure, a valve for reversibly connecting said source with said advancing and retracting means, a second valve between the control valve and said retracting means normally connecting said retracting means with said advancing means during the supply of fluid to said advancing means, means responsive to the build-up of a predetermined pressure on said advancing means to shift said second valve to exhaust said retracting means, and a check valve connected between the control valve and retracting means opening toward the latter to by-pass said second valve during the supply of fluid to said retracting means.

2. In a baling machine having a reciprocable baling plunger, the combination of a hydraulic motor having advancing and retracting means for driving said plunger, a source of fluid pressure having an exhaust line leading thereto, a valve for reversibly connecting said source with said advancing and retracting means, means normally connecting said retracting means with said advancing means during the supply of fluid to said advancing means, means responsive to a predetermined pressure built up on said advancing means to disconnect the retracting means therefrom and to connect it instead with exhaust, said fluid source comprising high and low pressure pumps in parallel, a by-pass from the low pressure pump to exhaust normally closed, and means responsive to a predetermined pressure developed by the high pressure pump to open said by-pass.

3. In a baling machine having a reciprocable baling plunger, the combination of a hydraulic motor having advancing and retracting means for driving said plunger, a source of fluid pressure having an exhaust line leading thereto, a valve for reversibly connecting said source with said advancing and retracting means, means normally connecting said retracting means with said advancing means during the supply of fluid to said advancing means, means responsive to a predetermined pressure built up on said advancing means to disconnect the retracting means therefrom and to connect it instead with exhaust, said fluid source comprising high and low pressure pumps in parallel, a by-pass from the low pressure pump to exhaust normally closed, and means responsive to a predetermined pressure developed by the high pressure pump to open said by-pass, the last-mentioned predetermined pressure being smaller than the first-mentioned predetermined pressure.

4. In a baling machine having a reciprocable baling plunger, the combination of a hydraulic motor having advancing and retracting means for driving said plunger, a source of fluid pressure having an exhaust line leading thereto, a valve for reversibly connecting said source with said advancing and retracting means, means normally connecting said retracting means with said advancing means during the supply of fluid to said advancing means, means responsive to a predetermined pressure built up on said advancing means to disconnect the retracting means therefrom and to connect it instead with exhaust, said fluid source comprising high and low pressure pumps in parallel, a by-pass from the low pressure pump to exhaust normally closed, and means responsive to a second predetermined pressure developed by the high pressure pump different from the first-mentioned predetermined pressure to open said by-pass.

5. In a baling machine having a reciprocable baling head, a banding mechanism, a tier mechanism, the combination of a first hydraulic motor for operating said baling head, a second hydraulic motor for actuating said banding mechanism, a third hydraulic motor for operating said tier mechanism, a hydraulically operated bale tensioning device and a source of fluid under pressure for supplying said hydraulic motors and said bale tensioning device, means normally interrupting the supply of fluid from said source to said second and third hydraulic motors while reversibly controlling the supply of fluid to said first hydraulic motor during the building up of a bale in said machine, means responsive to a bale of a predetermined size being built up for interrupting the supply of fluid from said source to said first hydraulic motor, means responsive thereafter for initiating the operation of said second and third hydraulic motors sequentially whereby only one of said motors is being operated by fluid from said source at any one time, and means connecting said tensioning device with said source operable to maintain a predetermined pressure in said tensioning device at all times.

6. In a baling machine having a reciprocable baling head, a banding mechanism, a tier mechanism, the combination of a first hydraulic motor for actuating said baling head, a second hydraulic motor for actuating said banding mechanism, a third hydraulic motor for actuating said tier mechanism, a hydraulically operated bale tensioning device, a source of fluid under pressure, means for connecting said source to said second and third motors normally operated to cause the said motors to dwell with the connected mechanisms in their retracted positions, means for reversibly controlling the supply of fluid from said source to said first hydraulic motor, means for maintaining a supply of fluid at a predetermined minimum pressure from said source to said tensioning device, control means responsive to the building up of a bale of a predetermined size for causing said first hydraulic motor to dwell with the baling head in its advanced position and under pressure, means jointly responsive to the building up of a bale of a predetermined size and to the movement of said baling head into its advanced position for sequentially actuating said second and third hydraulic motors to advance said banding mechanism and said tier mechanism, means responsive to the tier mechanism completing its advancing movement for sequentially actuating said third and second hydraulic motors respectively to retract said tier mechanism and said banding mechanism, and means responsive to the complete retraction of said mechanisms for again initiating the reversible supply of pressure fluid from said source to said first hydraulic motor.

References Cited in the file of this patent

UNITED STATES PATENTS

| | | |
|---|---|---|
| 877,193 | Holden | Jan. 21, 1908 |
| 1,040,278 | Collins | Oct. 8, 1912 |
| 2,396,720 | Nolt | Mar. 19, 1946 |
| 2,400,555 | Johnston | May 21, 1940 |
| 2,512,896 | Hill et al. | June 27, 1950 |
| 2,560,143 | Vetti | July 10, 1951 |
| 2,610,573 | Altgelt | Sept. 16, 1953 |
| 2,644,283 | Rogers et al. | July 7, 1953 |
| 2,646,745 | Seltzer | July 28, 1953 |